(12) United States Patent
Villasenor et al.

(10) Patent No.: US 12,423,195 B2
(45) Date of Patent: Sep. 23, 2025

(54) CONCURRENT RECOVERY OF EXPORTED PHYSICAL TAPE DATA

(71) Applicant: INTERNATIONAL BUSINESS MACHINES CORPORATION, Armonk, NY (US)

(72) Inventors: Ariel Villasenor, Tucson, AZ (US); Duke Andy Lee, Tucson, AZ (US); Alan Joseph Fisher, Tucson, AZ (US); David Alan Brettell, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 18/486,248

(22) Filed: Oct. 13, 2023

(65) Prior Publication Data

US 2025/0123930 A1    Apr. 17, 2025

(51) Int. Cl.
*G06F 11/00* (2006.01)
*G06F 11/14* (2006.01)
*G06F 3/06* (2006.01)

(52) U.S. Cl.
CPC ........ *G06F 11/1469* (2013.01); *G06F 3/0619* (2013.01); *G06F 11/1448* (2013.01); *G06F 11/1458* (2013.01); *G06F 2201/80* (2013.01); *G06F 2201/84* (2013.01)

(58) Field of Classification Search
CPC ............. G06F 11/1469; G06F 11/1458; G06F 11/1471
See application file for complete search history.

(56) References Cited

U.S. PATENT DOCUMENTS

| | | | |
|---|---|---|---|
| 7,774,566 B2 * | 8/2010 | Daily | G11B 27/329 711/111 |
| 8,006,049 B2 | 8/2011 | Friauf et al. | |
| 8,127,099 B2 * | 2/2012 | Astigarraga | G06F 11/0712 711/170 |
| 9,063,657 B2 * | 6/2015 | Thompson | G06F 3/0656 |
| 9,990,253 B1 * | 6/2018 | Rajimwale | G06F 11/1435 |
| 2004/0044853 A1 * | 3/2004 | Gibble | G06F 3/0686 711/156 |
| 2008/0082310 A1 * | 4/2008 | Sandorfi | G06F 11/1448 703/23 |
| 2009/0228676 A1 * | 9/2009 | Naganuma | G06F 12/0866 711/173 |
| 2011/0107140 A1 * | 5/2011 | Bish | G06F 11/004 711/111 |

(Continued)

OTHER PUBLICATIONS

"Automatic Recovery of Volumes on Behalf of a Failed Tape Library Controller in an Automated Tape Library," IP.com, IP.com No. IPCOM000193364D, Feb. 19, 2010, 7 pp.

(Continued)

*Primary Examiner* — Jonathan D Gibson
(74) *Attorney, Agent, or Firm* — KONRAD, RAYNES, DAVDA & VICTOR LLP; Rabindranath Dutta

(57) ABSTRACT

Provided are a method, system, and computer program product in which operations are performed for generating a logical recovery cache partition to perform testing and to recover exported data, wherein production data is separated from recovered data. Concurrent recovery of exported physical tape data is performed by the method, system, and computer program product.

19 Claims, 10 Drawing Sheets

(56) References Cited

U.S. PATENT DOCUMENTS

| | | | | |
|---|---|---|---|---|
| 2011/0145497 A1* | 6/2011 | Bish | .................... | G06F 11/1464 |
| | | | | 711/111 |
| 2013/0173859 A1* | 7/2013 | Gorrell | ................. | G06F 3/0686 |
| | | | | 711/112 |
| 2014/0067763 A1* | 3/2014 | Jorapurkar | .......... | G06F 11/1438 |
| | | | | 707/674 |
| 2014/0181395 A1* | 6/2014 | Vincent | ................. | G06F 3/0605 |
| | | | | 711/111 |
| 2014/0215145 A1* | 7/2014 | Ballard | ................. | G06F 3/0682 |
| | | | | 711/111 |
| 2015/0154084 A1* | 6/2015 | Iwasaki | ................. | G06F 11/263 |
| | | | | 714/19 |
| 2015/0154085 A1* | 6/2015 | Iwasaki | ............... | G06F 11/1469 |
| | | | | 707/678 |
| 2016/0259573 A1* | 9/2016 | Brettell | ................. | G06F 3/0619 |
| 2025/0123930 A1* | 4/2025 | Villasenor | ........... | G06F 11/1469 |

OTHER PUBLICATIONS

"Virtual Tape Data Migration by TS7700 Copy Export Function," IP.com No. IPCOM000199294D, Aug. 30, 2010, 5 pages.
K. Shotwell, et al., "IBM® TS7700 Series Copy Export Function User's Guide Version 2.9," IBM Corporation, 2022, 12 pp.

\* cited by examiner

CONCURRENT RECOVERY OF EXPORTED PHYSICAL TAPE DATA

BACKGROUND

Embodiments relate to a method, system, and computer program product for the concurrent recovery of exported physical tape data.

An enterprise virtual tape product may allow host systems to store data in the form of logical volumes. The host systems may write the logical volume data to a disk cache. Once the data is written on the disk cache, the enterprise virtual tape product manages the data according to user defined storage policies.

One such storage policy may instruct the enterprise virtual tape product to make a copy of the data in cache and write the data into one or more physical tape cartridges. Another storage policy may be to write the data and a snapshot of the database tables (also referred to as database backup) to a physical tape cartridge and allow the cartridge to be physically removed from the tape library to be stored offsite in case of a disaster. The process of writing the data from cache to tape and allowing the tapes to be taken offsite is known as "Copy Export". When the data from the copy exported tapes need to be recovered during a disaster recovery, the tapes can be inserted back into a tape library attached to the enterprise virtual tape product.

IBM® (IBM is a registered trademark of International Business Machines Corporation) TS7700 is an enterprise virtual tape product solution that optimizes data protection, business continuance and object store infrastructure. TS7700 operates at disk or solid-state drive (SSD) speeds while maintaining compatibility with existing tape operations. IBM TS7700's grid communication facility provides access from any host to all logical volumes and object store data in the grid, supporting superior business continuance.

The grid communication feature in TS7700 is designed to help keep data available, even if one of the remote sites experiences an outage; up to eight TS7700 systems can be configured to participate in a grid environment. This function helps maintain availability during planned maintenance, service or system upgrades, or unexpected outages and helps avoid the physical transportation of tape cartridges in the event of a disaster.

SUMMARY

Provided are a method, system, and computer program product in which operations are performed for generating a logical recovery cache partition to perform testing and to recover exported data, wherein production data is separated from recovered data.

In additional embodiments, concurrent recovery of exported physical tape data is performed, wherein operations performed further comprise: determining, via an error recovery process, whether a logical recovery cache partition already exists on a different cluster within a grid; in response to determining that there does not already exist a logical recovery cache partition, determining whether there is an available partition without data of a plurality of possible partitions to use as the logical recovery cache partition; and in response to determining that there is an available partition without data, continuing the error recovery process.

In yet additional embodiments, the operations performed further comprise: in response to determining that there is no available partition without data, indicating a failure of the error recovery process; and in response to determining that there is less than a predetermined amount of available free cache space, indicating a failure of the error recovery process.

In certain embodiments, a recovery database instance that is separate from an already existing database instance is generated. A checking is performed to determine if total records being imported exceeds an available space on the logical recovery cache partition, and attempt is made to increase partition size to accommodate additional space needed for the records being imported. Operations are performed in which in response to a failure of the attempt to increase the partition size to accommodate the additional space needed, a failure of the error recovery process is indicated.

In further embodiments, further operations performed comprise: moving records imported from storage volumes to a recovery database instance; and in response to receiving an indication to end an error recovery process, initiating an application to remove error recovery data, an available partition and the recovery database instance.

In additional embodiments, a recovery machine can be either a dedicated system or a production system, wherein a separate database instance keeps track of recovery data, and wherein the operations further comprise: creating a separation directory in a cache file system to hold the recovered data, and separating the recovered data from the production data.

In further embodiments, a logical volume that resides in the logical recovery cache partition can have a same volser id as a logical volume in a production cache partition.

In yet further embodiments, a list of production physical tape volume is separated from the list of copy exported tapes used in the recovery, wherein a management interface panel list tapes that will be coming in that will be used by a recovery process to avoid putting production data on the tapes.

In certain embodiments, an entity does a logical mount with a special flag indication that a logical volume resides in the logical recovery cache partition, wherein if a request of logical volume is not in the logical recovery cache partition, then a physical tape is looked at, and wherein if a host has verified the data from the logical recovery cache partition is valid, then the data is transferred to a production volume.

In further embodiments, if an entity has finished testing and recovering the exported data, then the entity is able to issue a host command to purge everything in the logical recovery cache partition, or retain data as is, or to delete the logical recovery cache partition, wherein the logical recovery cache partition can be created on any cluster within a grid, as long as one cluster has physical tape attached.

BRIEF DESCRIPTION OF THE DRAWINGS

Referring now to the drawings in which like reference numbers represent corresponding parts throughout.

DETAILED DESCRIPTION

Figure 1:
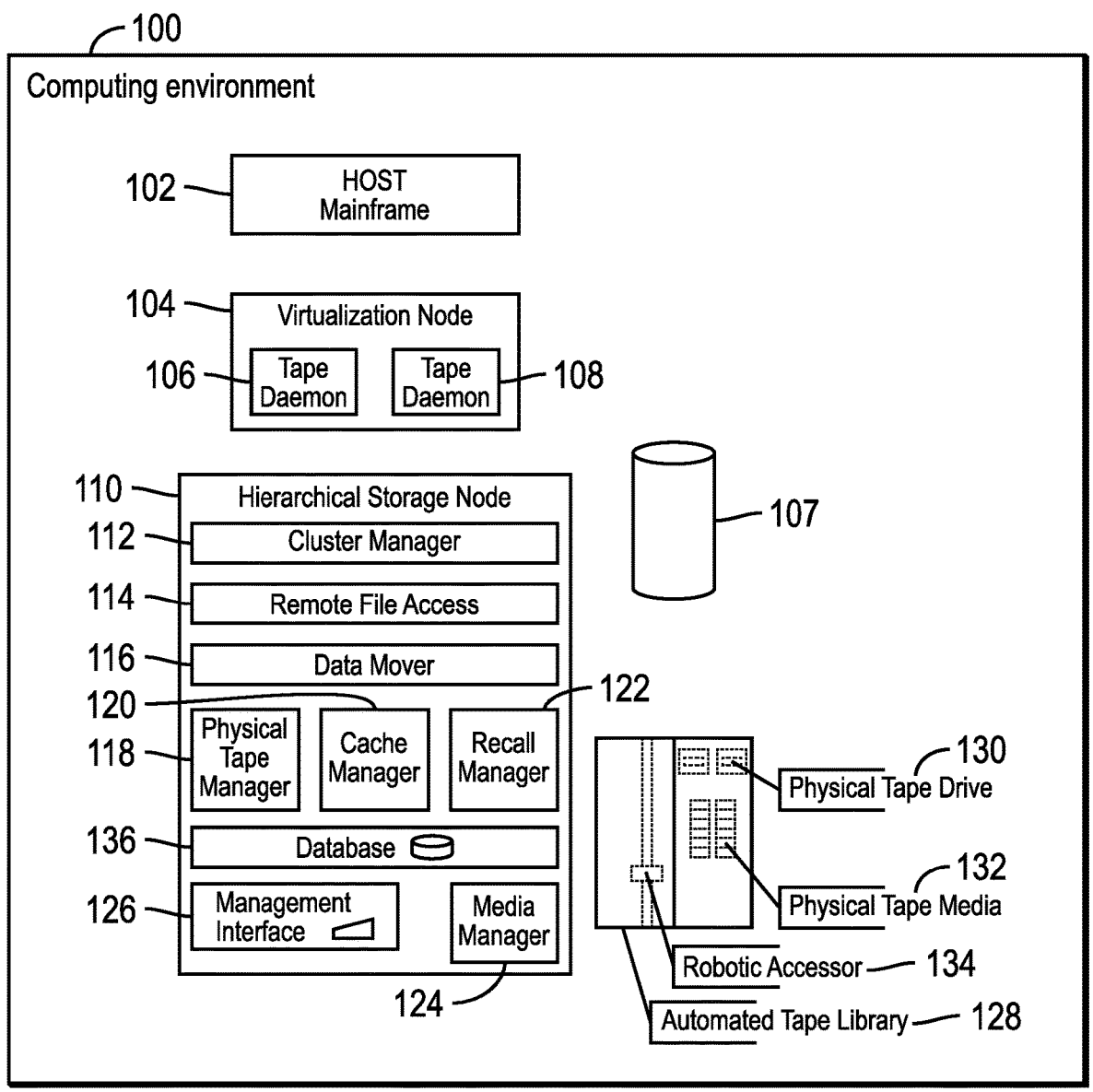
FIG. 1 illustrates a block diagram of a computing environment, in accordance with certain embodiments.

In the following description, reference is made to the accompanying drawings which form a part hereof and which illustrate several embodiments. It is understood that other embodiments may be utilized, and structural and operational changes may be made. Several examples will now be provided to further clarify various embodiments of the present disclosure.

Example 1: A method in which in which operations are performed for generating a logical recovery cache partition to perform testing and to recover exported data, wherein production data is separated from recovered data. As a result, concurrent recovery of exported physical tape data is performed.

Example 2: The limitations of any of Examples 1 and 3-10 in which in additional embodiments, concurrent recovery of exported physical tape data is performed, wherein operations performed further comprise: determining, via an error recovery process, whether a logical recovery cache partition already exists on a different cluster within a grid; in response to determining that there does not already exist a logical recovery cache partition, determining whether there is an available partition without data of a plurality of possible partitions to use as the logical recovery cache partition; and in response to determining that there is an available partition without data, continuing the error recovery process. As a result, cache partitions are used in the concurrent recovery of exported physical tape data.

Example 3: The limitations of any of Examples 1-2 and 4-10 in which in yet additional embodiments, the operations performed further comprise: in response to determining that there is no available partition without data, indicating a failure of the error recovery process; and in response to determining that there is less than a predetermined amount of available free cache space, indicating a failure of the error recovery process. As a result, partitions and amount of free cache space are used in the process of concurrent recovery of exported physical tape data.

Example 4: The limitations of any of Examples 1-3 and 5-10 on which in certain embodiments, a recovery database instance that is separate from an already existing database instance is generated. A checking is performed to determine if total records being imported exceeds an available space on the logical recovery cache partition, and attempt is made to increase partition size to accommodate additional space needed for the records being imported. Operations are performed in which in response to a failure of the attempt to increase the partition size to accommodate the additional space needed, a failure of the error recovery process is indicated. As a result, partition size may be increased in the process of concurrent recovery of exported physical tape data.

Example 5: The limitations of any of Examples 1-4 and 6-10 in which in further embodiments, further operations performed comprise: moving records imported from storage volumes to a recovery database instance; and in response to receiving an indication to end an error recovery process, initiating an application to remove error recovery data, an available partition and the recovery database instance. As a result, error recovery data may be removed in the process of concurrent recovery of exported physical tape data.

Example 6: The limitations of any of Examples 1-5 and 7-10 in which in additional embodiments, a recovery machine can be either a dedicated system or a production system, wherein a separate database instance keeps track of recovery data, and wherein the operations further comprise: creating a separation directory in a cache file system to hold the recovered data, and separating the recovered data from the production data. As a result, separation directory in a cache file system may be used in the process of concurrent recovery of exported physical tape data.

Example 7: The limitations of any of Examples 1-6 and 8-10 in which in further embodiments, a logical volume that resides in the logical recovery cache partition can have a same volser id as a logical volume in a production cache partition. As a result, volser ids are used in the process of concurrent recovery of exported physical tape data.

Example 8: The limitations of any of Examples 1-7 and 9-10 in which in yet further embodiments, a list of production physical tape volume is separated from the list of copy exported tapes used in the recovery, wherein a management interface panel list tapes that will be coming in that will be used by a recovery process to avoid putting production data on the tapes. As a result, a management interface panel is provided in the process of concurrent recovery of exported physical tape data.

Example 9: The limitations of any of Examples 1-8 and 10 in which in certain embodiments, an entity does a logical mount with a special flag indication that a logical volume resides in the logical recovery cache partition, wherein if a request of logical volume is not in the logical recovery cache partition, then a physical tape is looked at, and wherein if a host has verified the data from the logical recovery cache partition is valid, then the data is transferred to a production volume. As a result, data may be transferred to a production volume in the process of concurrent recovery of exported physical tape data.

Example 10: The limitations of any of Examples 1-9 in which in further embodiments, if an entity has finished testing and recovering the exported data, then the entity is able to issue a host command to purge everything in the logical recovery cache partition, or retain data as is, or to delete the logical recovery cache partition, wherein the logical recovery cache partition can be created on any cluster within a grid, as long as one cluster has physical tape attached. As a result, retention and purging of data are performed in the process of concurrent recovery of exported physical tape data.

Example 11: A system, comprising a memory, and a processor coupled to the memory, where the processor performs operations, the operations comprising performing a method according to any one of Examples 1-10. As a result, concurrent recovery of exported physical tape data is performed.

Example 12: A computer program product, the computer program product comprising a computer readable storage medium having computer readable program code embodied therewith, the computer readable program code when executed is configured to perform operations, the operations comprising performing a method according to any of Examples 1-10. As a result, concurrent recovery of exported physical tape data is performed.

It is noted that while embodiments have been provided by using the TS7700 as an example, in alternative embodiments other enterprise virtual tape products besides the TS7700 may be used.

A "Copy Export" function is supported on certain configurations of the TS7700, including "Grid" configurations. In a Grid configuration, each TS7700 is considered a separate source TS7700. This means that only the physical volume exported from a source TS7700 can be used for recovery of a source TS7700. Physical volumes from more than one source TS7700 in a Grid configuration cannot be combined to use in recovery. Recovery is only to a single cluster configuration. The TS7700 used for recovery has to be configured as cluster 0. After recovery, a Grid configuration may be recreated. To perform a copy export operation, the TS7700 may need to have a minimum of four available physical tape drives for each installed drive type.

The copy export function allows a copy of selected logical volumes written to the TS7700 to be removed and taken offsite for disaster recovery purposes. The benefits of volume stacking which places many logical volumes on a physical volume, are retained with the copy export function. In addition, since the data being exported is a copy of the logical volume, the logical volume data remains accessible to the production host systems.

The operations for using copy export may be performed by a process as follows:
(1) Determine the data that is needed for offsite disaster recovery purposes. Through automatic class selection routines, assign a management class that specifies a secondary volume pool to any data that is to be copy exported. As logical volumes are written to the TS7700 and then closed, they are scheduled to be copied to a physical tape volume. With a management class that specifies a secondary copy pool, the data is copied both to a primary pool physical volume and a secondary pool physical volume.
(2) When it is time to remove the physical volumes that have a copy of the data on them, first write an Export List File volume to the TS7700 that is to perform the copy export operation. The export list file volume contains instructions for the copy export operation, one of the key instructions being the number of the physical volume pool to export. The export list file volume may also hold a status file that contains records generated by the TS7700 as part of the copy export operation. Secondly, once the export list file volume has been written and closed, issue the Library Export z/OS console command. It is expected that customers will execute the copy export operation on a periodic basis, possibly even more than once a day. (Since the purpose is to get a copy of the data offsite for disaster recovery purposes, performing it soon after the data is created minimizes the time for the recovery point objective.)
(3) In processing a copy export operation, the TS7700 first copies any logical volumes assigned to the pool being exported that only have a copy of the logical volume in the cache. Next, each of the physical volumes in the specified pool that contains active data is mounted and a database backup of the TS7700 is written to all or four of them. Status records are written to the export list file volume and then the physical volume is ejected from the library. Once all the physical volumes in the pool have been processed, the copy export operation is complete. On the completion of the copy export operation, a summary status console message is generated. The status file on the export list file volume contains detailed information about the execution of the copy export operation and is retained for future reference.
(4) An operator removes the physical volumes from the Input/Output (I/O) station of the library and prepares them for shipment to an offsite location.

In certain mechanisms, to use the copy exported physical volumes for recovery, a process may perform the following operations:
(1). Place all of the copy exported physical volumes from the same source TS7700 into a library attached to an empty TS7700. In other words, the TS7700 used for this operation must not contain any host data.
(2). Execute Copy Export Recovery which is a selection through the recovery TS7700's management interface. A key piece of information to provide is the volume serial number (volser) of one of the last copy exported physical volumes on which database backup of the source TS7700 is recorded. The recovery TS7700 uses the database backup on that volume as part of the recovery process. There are many sources for this volume serial number, including the last export list file volume's status file, on the library manager logs of the source library for certain versions, or host console logs of the source host. For certain versions, not all volumes will contain a valid database backup that can be used for recovery.
(3) Monitor the progress of the recovery through the management interface.
(4) Restore the host environment. This can be performed in parallel with the copy export recovery operation.
(5) After the recovery completes, only the secondary copy of data exists for systems in certain versions. On other versions only a primary copy of volumes exists after recovery.
(6) Once the copy export recovery operation has completed, the process can vary the TS7700s virtual drives online to the host and resume processing.

In certain embodiments, if the system plans on writing data to the recovered TS7700, the system will need to insert logical volumes to be used as scratch volumes. The system will need to add scratch physical volumes to the recovery TS7700 even if applications are only planning on reading data. A minimum of 2 scratch volumes per defined pool in the TS7700 is needed to prevent the TS7700 from entering the out of scratch state. In addition, a minimum of 3 scratch volumes are required for pool 0. In the out of scratch state, logical volume mounts are not allowed.

The current implementations of recovering the copy exported data from the tape cartridges is by the use of the Copy Export Disaster Recovery process. Using a web based TS7700 Management Interface, a customer can run the Copy Export Disaster Recovery process to read the data from the tapes back into the disk cache that has no existing data. The important point to note here is that the system used for this recovery process must not be a production system with host data. Thus, the periodic testing of the data recovery requires the additional investment in hardware and infrastructure by the customer. The hardware, software, and infrastructure requirements to initiate the data recovery process or simply to perform periodic data recovery testing can be quite expensive to customers. Thus, there is a need to provide mechanisms to allow a customer to use the existing production environment to test the data recovery process or to perform an actual data recovery. Having such a method would be beneficial and desirable for TS7700 customers.

In real life support of TS7700 customers, there is a need to recover copy exported data on demand using any TS7700 system, not just an empty TS7700 dedicated for disaster recovery. Being able to use any TS7700 system, especially a production level TS7700, to quickly recover the data would be greatly desirable for the TS7700 customers.

The embodiments provide mechanisms to recover host data that was once copy exported out of the tape library without having to use a clean standalone TS7700 virtual tape server. In the current approach to data recovery of a copy exported tape, the requirement of having a clean server requires that there is no host data. written to the box and that it is not part of Grid setup with other clusters residing in the Grid. Unlike the current approach, certain embodiments allow the customer to recover the copy exported host data on tape cartridges to a production TS7700 virtual tape server regardless of whether it is host data or not and also whether it is part of Grid setup or not.

Certain embodiments simulate a clean TS7700 server by the use of a virtual cache partition (also known as recovery cache partition) created specifically for storing and managing the recovered host data. In the embodiments, there is a new process to test and verify the Export Recovery (ER) process.

In certain embodiments, only one cluster within the grid can have the recovery partition. When testing the ER process or recovering volumes from the ER process, if a recovery partition already exists on a different cluster within the grid, the process will fail. The ER process will then check if there is an available partition of the 7 possible partitions to use as the recovery partition. If there is no available partition, the operation will fail. If there is an available partition, the ER process creates the recovery partition. If there is an existing recovery partition without data the process continues, and otherwise the operation fails. In addition, if there are less than 3 Terabytes of available space, the process will fail. The process will then create a recovery database (DB) instance that is separate from the already existing DB instance. There is a check to see if the total records being imported exceeds the available space on the partition. If the data exceeds the partition size, an attempt is made to increase partition size to match the needed space. If there isn't enough available space, the process fails. All the records imported from the volumes will go to the newly created recovery DB instance. From here, there will be changes to the host OS that will allow for the host to specify which logical volume they would like to read the data from. When the user chooses to end the recovery process, a tool will be made available in the management interface to remove the ER data, ER partition and ER DB instance. Before a customer can test the ER process, the customer will export the volumes the same way as it is done now. Once there are copy exported tapes, the customer can initiate the ER process where logical volume data from the tapes can be recovered into an existing TS7700.

In certain embodiments, there are web-based functions to allow the customer to configure a Copy Export Recovery Cache Partition (CERCP). The TS7700 can have up to 7 cache partitions created for various purposes and the CERCP will be the medium in which the recovered data may reside. The customer may be able to define how large in size the CERCP will be. Only one cluster within the grid can have the CERCP. If a CERCP already exists on a different cluster within the grid, the creation of another CERCP will fail. Certain embodiments will check if there is an available cache partition of the 7 possible partitions to use as the CERCP. If there isn't any available cache partition, the operation will fail. If there is an available cache partition, certain embodiments create the CERCP. If there is an existing recovery partition without data the process continues, otherwise the operation fails. In addition, if there is less than 3 Tera bytes of available space, the process will fail. The process will then create a recovery DB instance that is separate from the already existing DB instance.

Certain embodiments provide a web-based graphical user interface to allow the customer to provide some inputs and to initiate the ER process (it may be referred to as the IER webpage). From the IER webpage, the customer may need to specify all the tape cartridges that will be part of the ER process (the ER tape list). Using the same webpage, the customer will specify the 6-character volser label of the tape cartridge that contains the latest database backup (DB backup tape). The IER webpage may also have a button to initiate the ER process.

Once the customer initiates the ER process, the entire batch of copy export tapes may be inserted into the tape library attached to the TS7700 where the ER process will take place. From the ER tape list that was configured by the customer, in certain embodiments it will be known which of the inserted tapes will be part of the recovery. In certain embodiments it will also be known which of the inserted tapes is the DB backup tape. Certain embodiments will mount the DB backup tape to a physical tape drive, read the database backup from the tape, and import the tables from the database backup into a newly created database instance. By creating a separate database instance from the production database instance, the recovery database information can be kept isolated from the production database information.

Once certain embodiments have imported the recovery database information, the ER process will indicate a completion status on the IER webpage for the customer to see. Upon seeing the completion status, the customer can then choose to read any of the logical volumes contained in the batch of copy exported tapes. In certain embodiments, the host software will send a command to the TS7700 to mount a logical volume that was stacked to a physical volume in the ER tape list (there may be a flag in the host command to point to the ER version of the logical volume). Certain embodiments may mount the tape cartridge that contains the specified logical volume and recall the data into the CERCP. Once the logical volume is recovered to the CERCP, the host can choose to do what it wants with the data.

Once the customer has verified that the ER process is working properly, they will have the ability to either retain the data in the CERCP or delete it all together. Certain embodiments provide a web-based graphical user interface to allow the customer to view the list of logical volumes that reside in the CERCP. On the same webpage, the customer can choose to get rid of all the logical volumes in the CERCP to prepare for another recovery test.

FIG. 1 illustrates a block diagram of a computing environment 100, in accordance with certain embodiments.

The computing environment 100 includes a host 102 which in certain embodiments may comprise a mainframe computer. The host 102 initiates and runs the tape jobs on a virtual tape subsystem as if the device was a tape drive.

The virtualization node 104 includes one or more tape daemons 106, 108 where a tape daemon in the virtualization node 104 emulates a tape drive to the host 102, but actually operates on a file that is either on the local disk virtual volume cache 107 or operates on a file in a remote cluster's disk virtual volume cache through a remote file access server.

The disk virtual volume cache 107 contains the virtual volumes being operated on and stores additional virtual volumes for rapid access.

The hierarchical storage node 110 includes a cluster manager 112, a remote file access application 114, a data mover 116, a physical tape manager 118, a cache manager, 120, a recall manager 122, a media manager 124, and a management interface 126.

The cluster manager 112 (also referred to as a grid) coordinates operations between clusters (only one cluster is shown in FIG. 1). It uses "tokens" that are stored in each cluster's database to determine which cluster has a current copy of the data and coordinates copying of data between clusters.

The remote file access application 114 provides a link to a local disk virtual volume cache for access by any remote cluster.

The data mover 116 controls the actual data transfer operations for copies performed between clusters and transfers of data between physical tape media and the disk virtual volume cache.

The physical tape manager 118 controls the physical tapes in the system. It manages the physical tapes in multiple pools, controls reclamation, the borrowing and return of volumes from a common scratch pool and movement of tapes between pools.

The cache manager 120 controls the copying of data from the disk virtual volume cache to physical media and the subsequent removal of the redundant copy of data in the disk cache. It also provides the control signals to balance data flow between the different components and the disk cache.

The recall manager 122 queues and controls recall of data into the disk virtual volume cache from physical media for either virtual tape daemons or copies requested by the cluster manager 112.

The media manager 124 manages the handling of the physical tapes and error recovery. It diagnoses errors and determines if they are caused by the physical tape drives or the physical tape media and takes appropriate action.

The management interface 126 provides information about the system and allows user control and configuration of the system.

An automated tape library 128 that includes one or more physical tape drives 130 and physical tape media 132 and robotic accessors 134 are also shown in FIG. 1. A database 136 is maintained in the hierarchical storage node 110.

Figure 2:
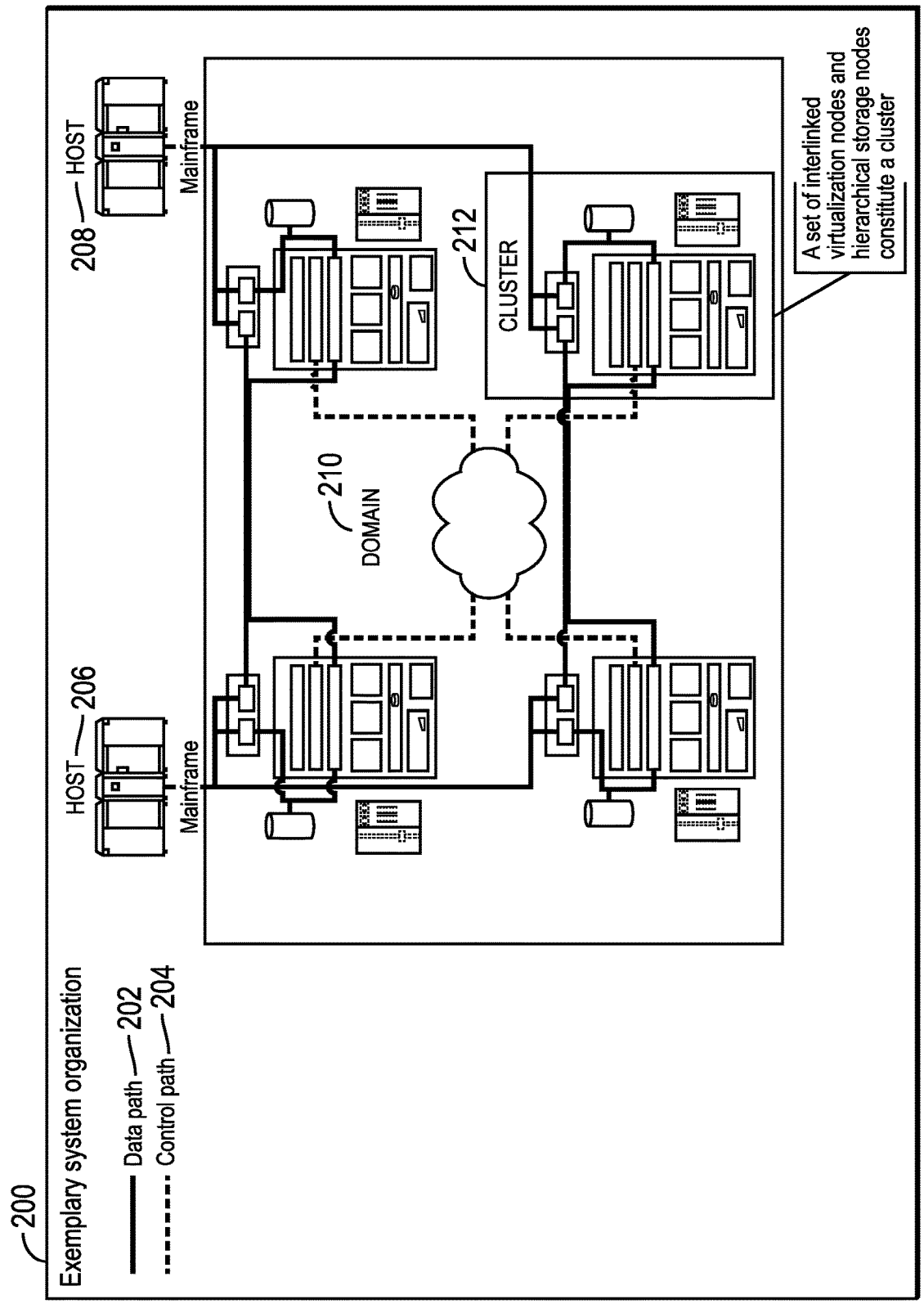
FIG. 2 illustrates a block diagram of an exemplary system organization, in accordance with certain embodiments.

FIG. 2 illustrates a block diagram of an exemplary system organization 200 in accordance with certain embodiments. Data paths are shown via solid lines and control paths via dashed line as shown via reference numeral 202, 204.

FIG. 2 shows a plurality of hosts 206, 208 coupled to a domain 210 where a domain is a set of interconnected clusters (4 clusters including cluster 212 is shown in FIG. 2). In general N clusters can form a domain, where N is a natural number. In certain embodiments N is restricted to being less than or equal to 8 in number. A cluster is a set of interlinked virtualization nodes and hierarchical storage nodes.

Figure 3:
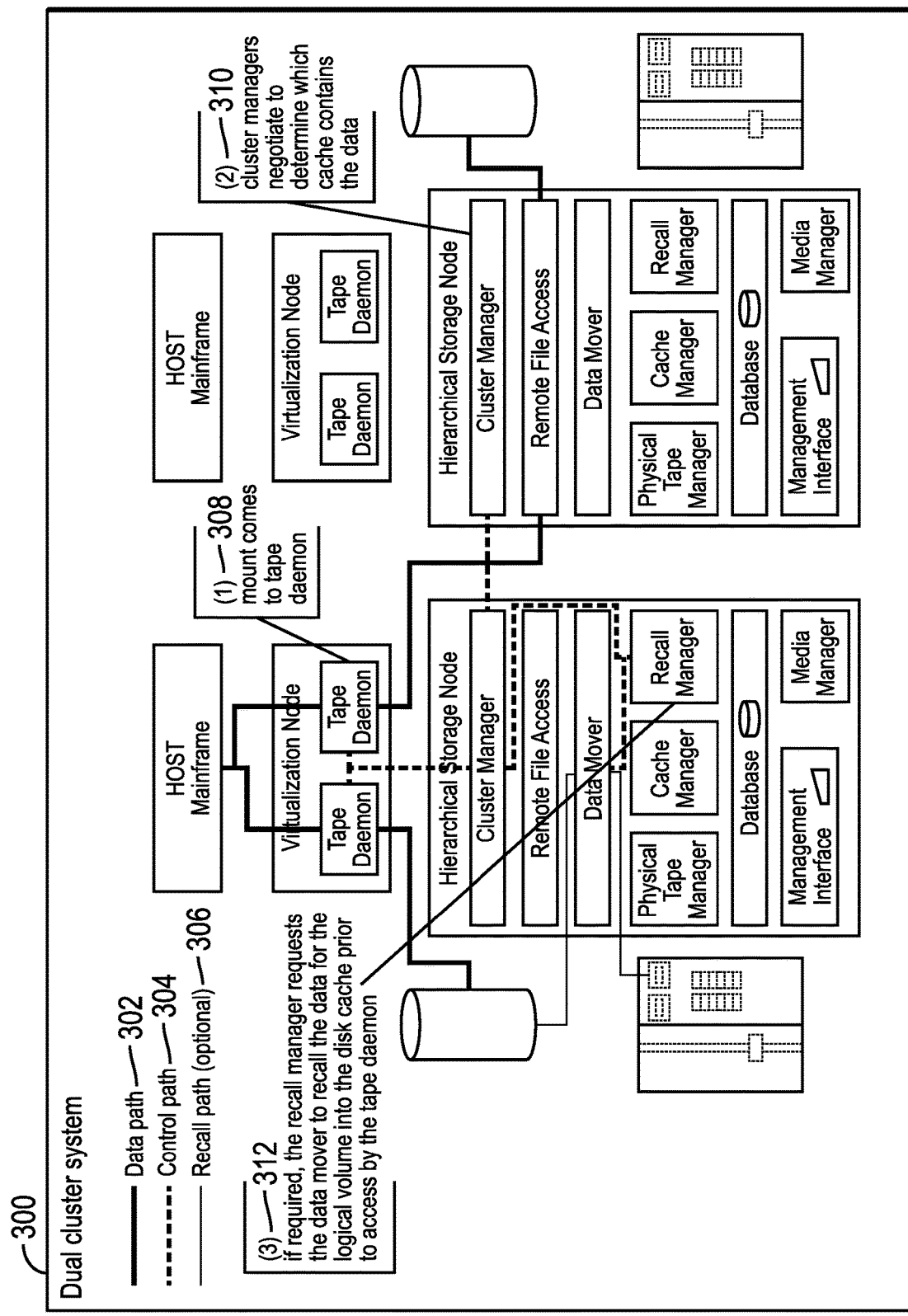
FIG. 3 illustrates a block diagram that shows a dual cluster system, in accordance with certain embodiments.

FIG. 3 illustrates a block diagram that shows a dual cluster system 300, in accordance with certain embodiments. The data path, the control path and the optional recall paths are shown via the legends 302, 304, 306. A sequence of three key operations is shown in FIG. 3. First a mount comes to a tape daemon (reference numeral 308). Cluster managers negotiate to determine which cache contains the data (reference numeral 310). If required, the recall manager requests the data mover to recall the data for the logical volume into the disk cache prior to access by the tape daemon (reference numeral 312).

Figure 4:
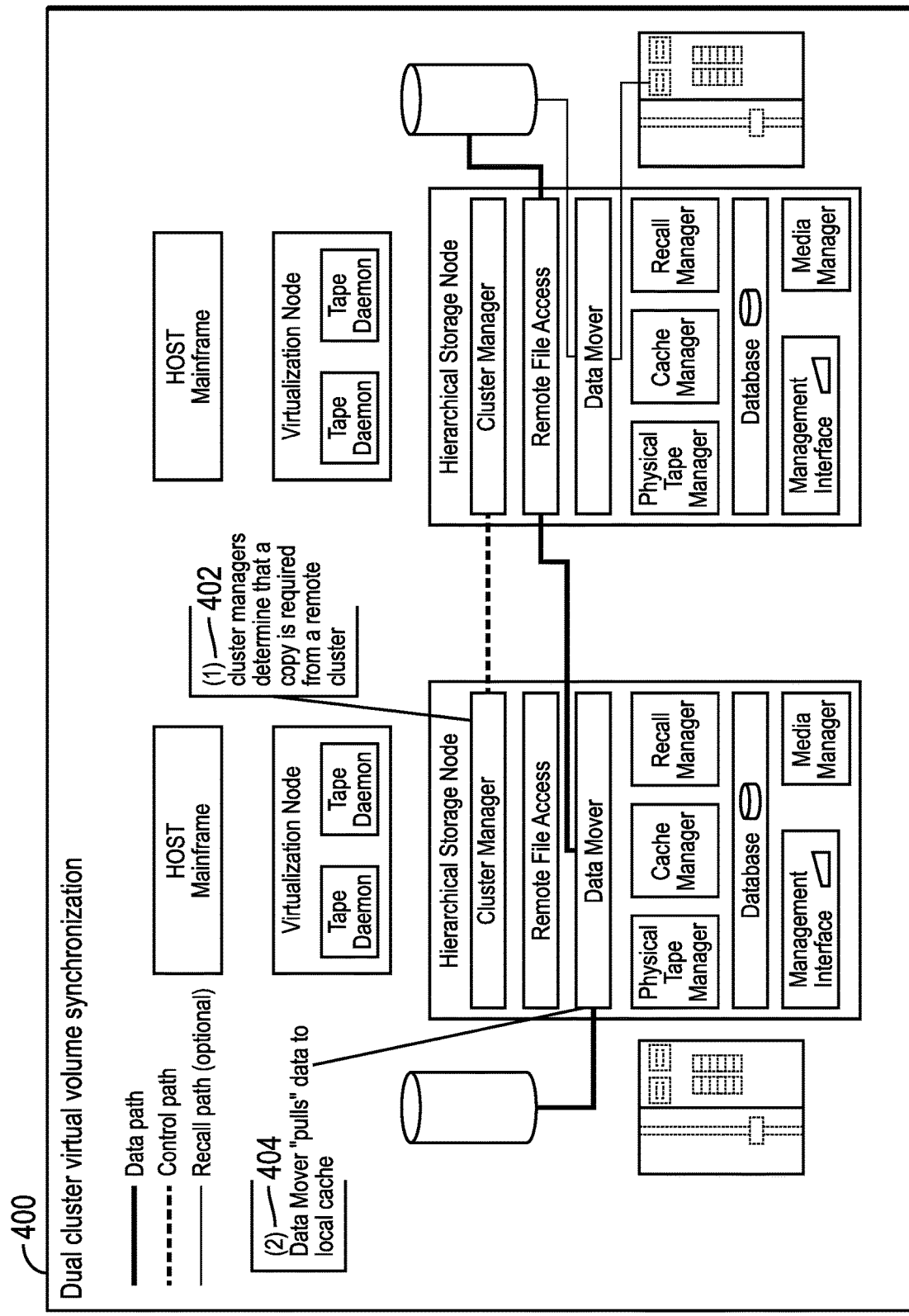
FIG. 4 illustrates a block diagram that shows dual cluster virtual volume synchronization, in accordance with certain embodiments.

FIG. 4 illustrates a block diagram that shows dual cluster virtual volume synchronization 400, in accordance with certain embodiments. The cluster manager determines that a copy is required from a remote cluster (reference numeral 402), and the data mover pulls data to local cache. (reference numeral 404).

Figure 5:
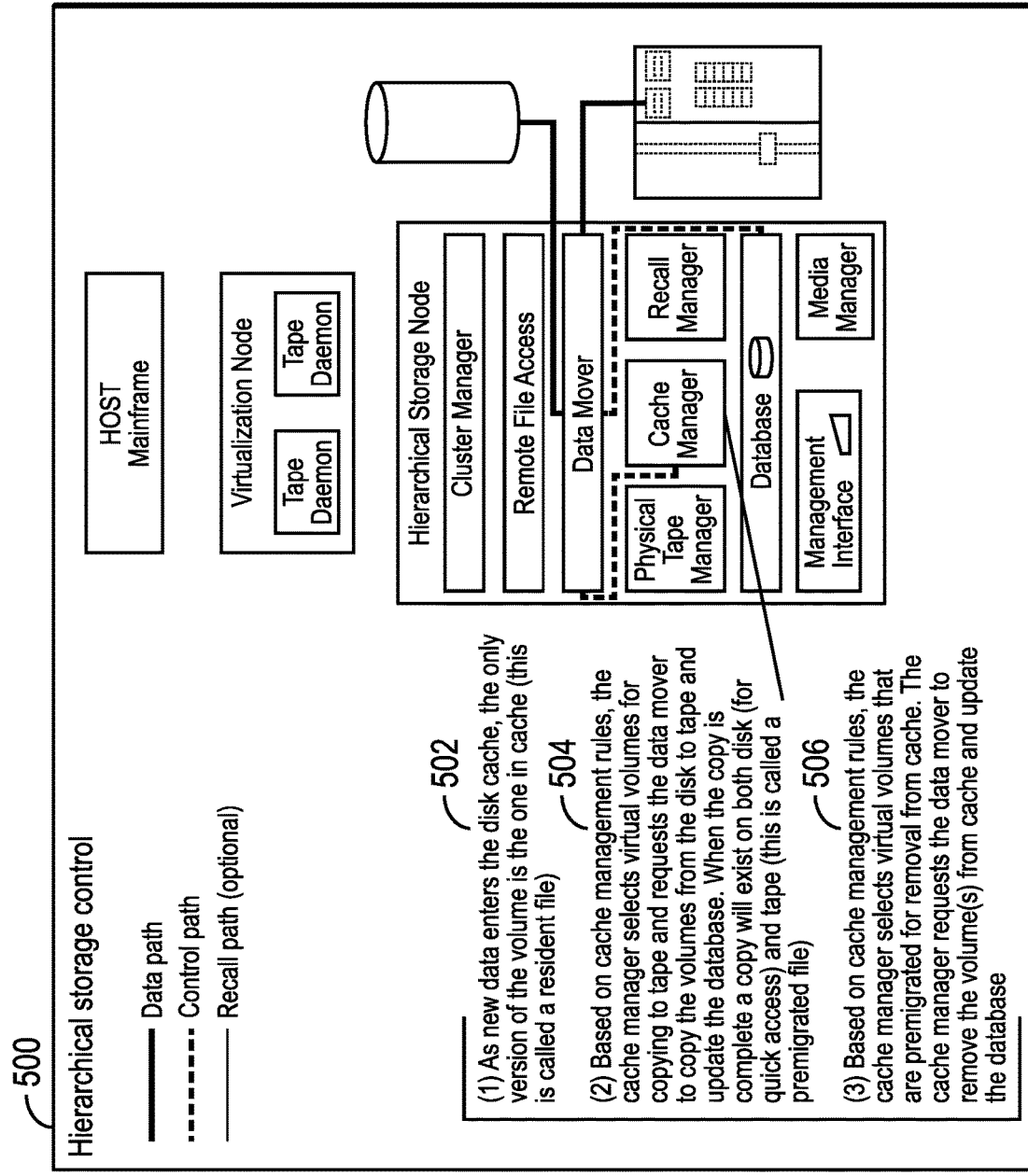
FIG. 5 illustrates a block diagram that shows a hierarchical storage control, in accordance with certain embodiments.

FIG. 5 illustrates a block diagram that shows a hierarchical storage control 500, in accordance with certain embodiments.

As new data enters the disk cache, the only version of the volume is the one in cache (this is called a resident file) [reference numeral 502].

Based on cache management rules, the cache manager selects virtual volumes for copying to tape and requests the data mover to copy the volumes from the disk to tape and update the database. When the copy is complete a copy will exist on both disk (for quick access) and tape (this is called a premigrated file) [reference numeral 504].

Based on cache management rules, the cache manager selects virtual volumes that are premigrated for removal from cache. The cache manager requests the data mover to remove the volume(s) from cache and update the database [reference numeral 506].

Figure 6:
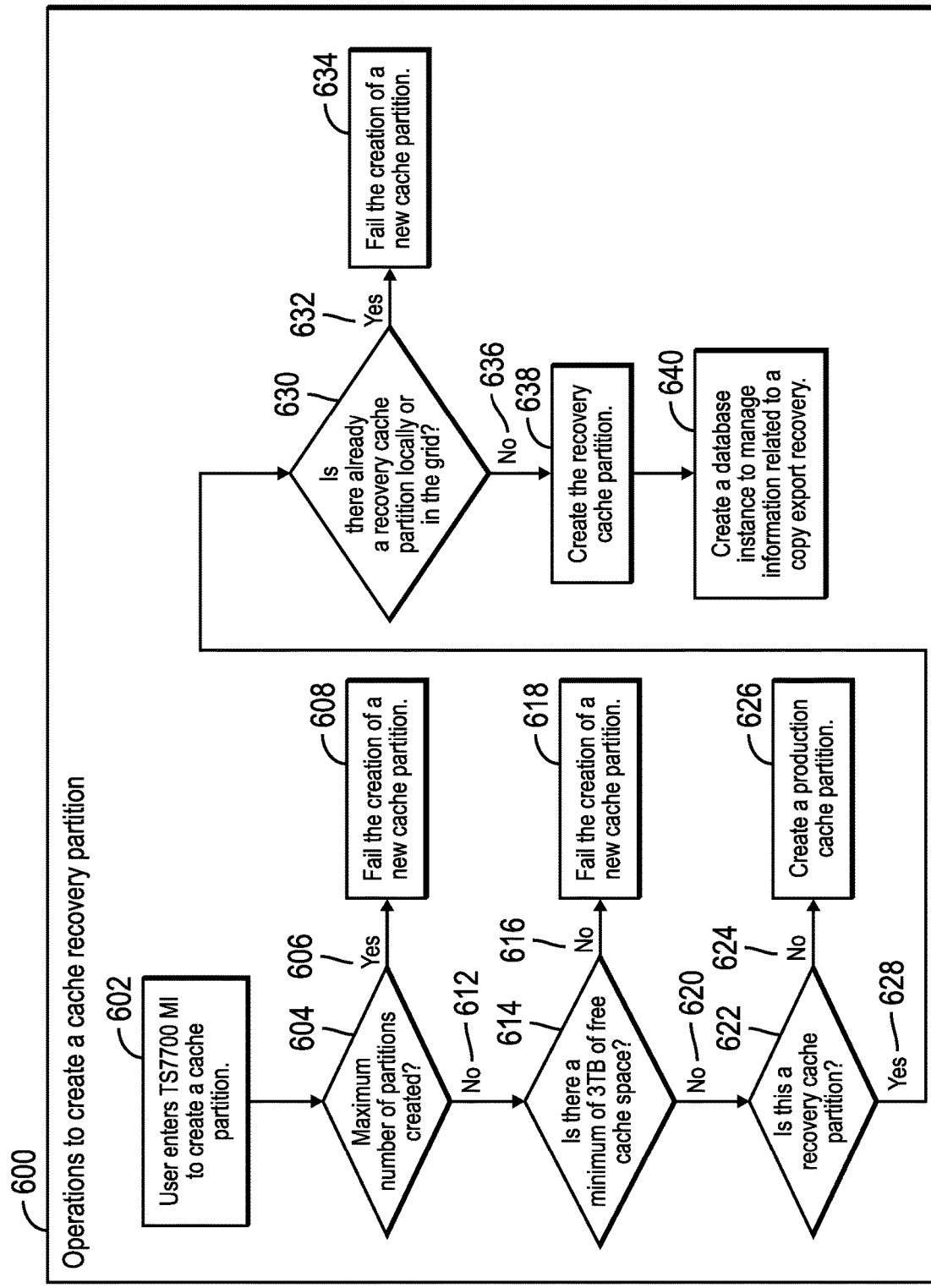
FIG. 6 illustrates a flowchart that shows operations to create a cache recovery partition, in accordance with certain embodiments.

FIG. 6 illustrates a flowchart 600 that shows operations to create a cache recovery partition, in accordance with certain embodiments.

Control starts at block 602 in which a user enters the TS7700 management interface (MI) to create a cache partition, Control proceeds to block 604 in which a determination is made as to whether the maximum number of partitions has been created. If so ("Yes" branch 606) then there is a failure in the creation of a new cache partition (at block 608). If not, then ("No" branch 612) control proceeds to block 614.

At block 614, a determination is a made as to whether there is a minimum of 3 TB of free cache space. If not ("No" branch 616) then there is a failure in the creation of a new cache partition (at block 618). If so ("Yes" branch 620) then control proceeds to block 622.

At block 622 a determination is made as to whether the partition is a recovery cache partition. If not ("No" branch 624), then a production cache partition is created (at block 626). If so, ("Yes" branch 628) then control proceeds to block 630.

At block 630 a determination is made as to whether there already is a recovery cache partition locally or in the grid. If so ("Yes" branch 632) then there is a failure in the creation of a new cache partition (at block 634). If not ("No" branch 636) control proceeds to block 638.

At block 638 the recovery cache partition is created. A database instance is created to manage information related to a copy export recovery (at block 640).

Figure 7:
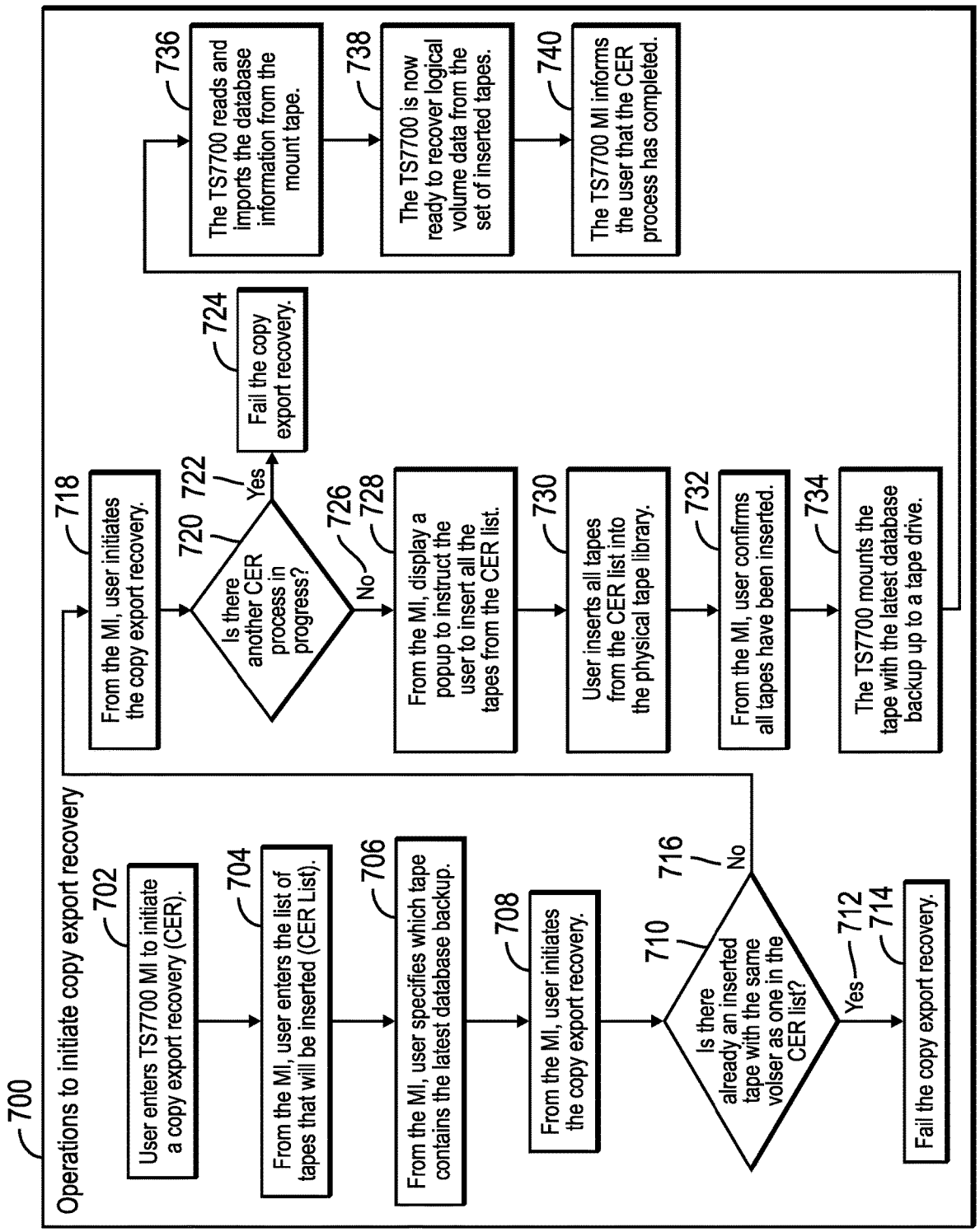
FIG. 7 illustrates a flowchart that operations to initiate copy export recovery, in accordance with certain embodiments.

FIG. 7 illustrates a flowchart 700 that operations to initiate copy export recovery, in accordance with certain embodiments.

Control starts at block 702 in which a user enters the TS7700 management interface (MI) to initiate (at block 704) a copy export recovery (CER). From the MI, user enters the list of tapes that will be inserted (CER List). From the MI, user specifies (at block 706) which tape contains the latest database backup.

From the MI, the user initiates (at block 708) the copy export recovery. Control proceeds to block 710 in which a determination is made as to whether there already is an inserted tape with the same volser as one in the CER list. If so ("Yes" branch 712), then there is a failure in the copy export recovery (at block 714). If not ("No" branch 716) control proceeds to block 718.

From the Ml, the user initiates (at block 718) the copy export recovery. A determination is made (at block 720) as to whether there is another CER process in progress. If so ("Yes" branch 722), then there is a failure of the copy export recovery (at block 724). If not ("No" branch 726) then control proceeds to block 728.

At block 728, from the Ml, the process displays a popup to instruct the user to insert all the tapes from the CER list user inserts (at block 730) all tapes from the CER list into the physical tape library. From the MI, user confirms (at block 732) that all tapes have been inserted.

From block 732 control proceeds to block 734 in which the TS7700 mounts (at block 734) the tape with the latest database backup to a tape drive. The TS7700 reads and imports the database information from the mounted tape (at block 736). The TS7700 is now ready to recover logical volume data from the set of inserted tapes (at block 738). The TS7700 MI informs (at block 740) the user that the CER process has been completed.

Figure 8:
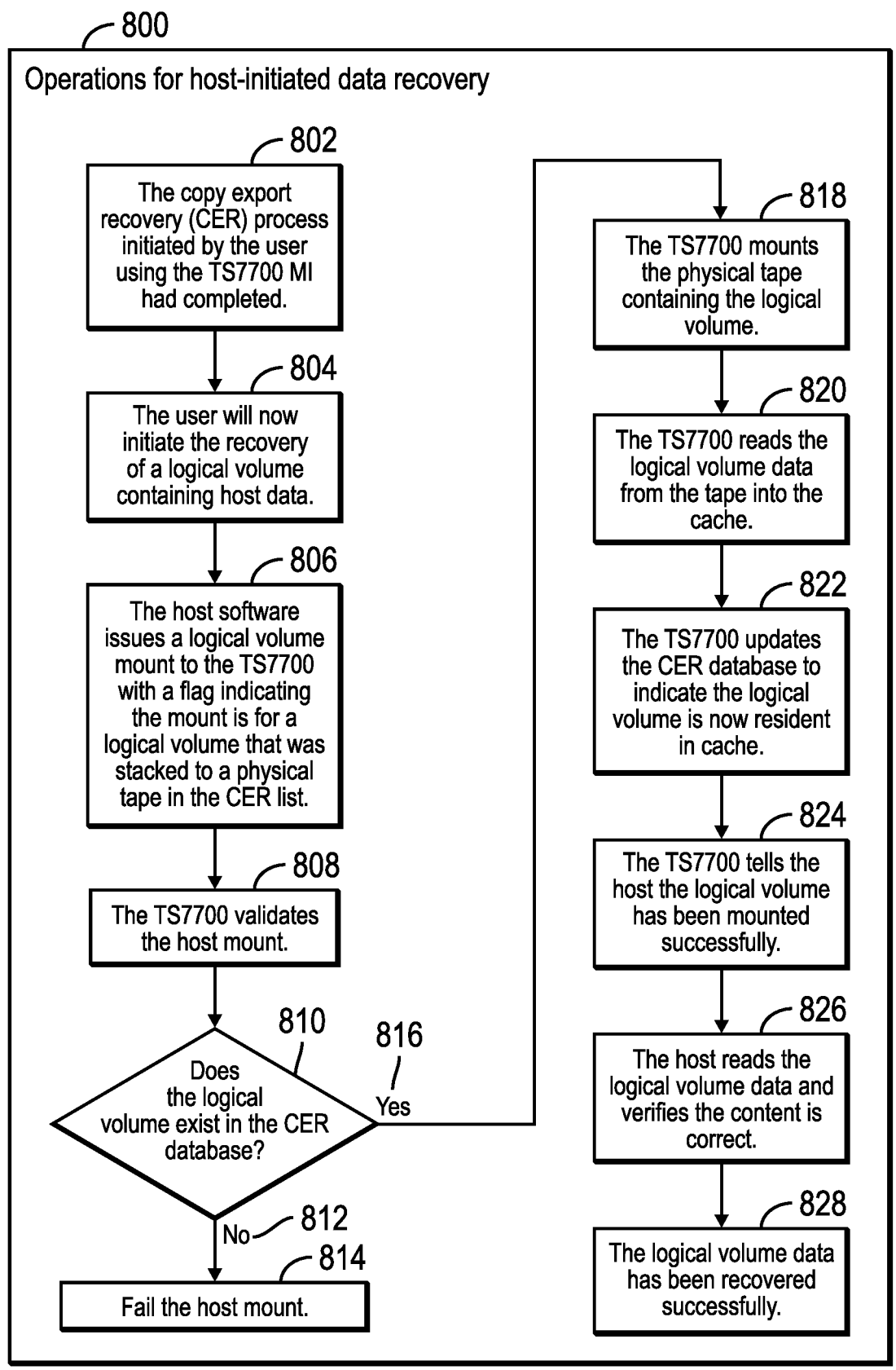
FIG. 8 illustrates a flowchart that shows operations for host-initiated data recovery, in accordance with certain embodiments.

FIG. 8 illustrates a flowchart 800 that shows operations for host-initiated data recovery, in accordance with certain embodiments.

Control starts at block 802 in which a determination is made that the copy export, recovery (CER) process initiated by the user using the TS7700 MI has completed. The user will now initiate the recovery of a logical volume containing host data (at block 804).

The host software issues (at block 806) a logical volume mount to the TS7700 with a flag indicating that the mount is for a logical volume that was stacked to a physical tape in the CER list. The TS7700 validates (at block 808) the host mount and control proceeds to block 810.

At block 810 a determination is made (at block 810) as to whether the logical volume exists in the CER database. If not ("No" branch 812) then the host mount fails at block 814). If so, ("Yes" branch 816) then the TS7700 mounts the physical tape containing the logical volume (at block 818). The TS7700 reads the logical volume data from tape into the cache (at block 820), Control proceeds to block 822 in which the TS7700 updates the CER database to indicate that the logical volume is now resident in cache (at block 822). The TS7700 indicates to the host that the logical volume has been mounted successfully (at block 824). The host reads (at block 826) the logical volume data and verifies the content is correct. It is determined (at block 828) that the logical volume data has been recovered successfully (at block 828).

Figure 9:
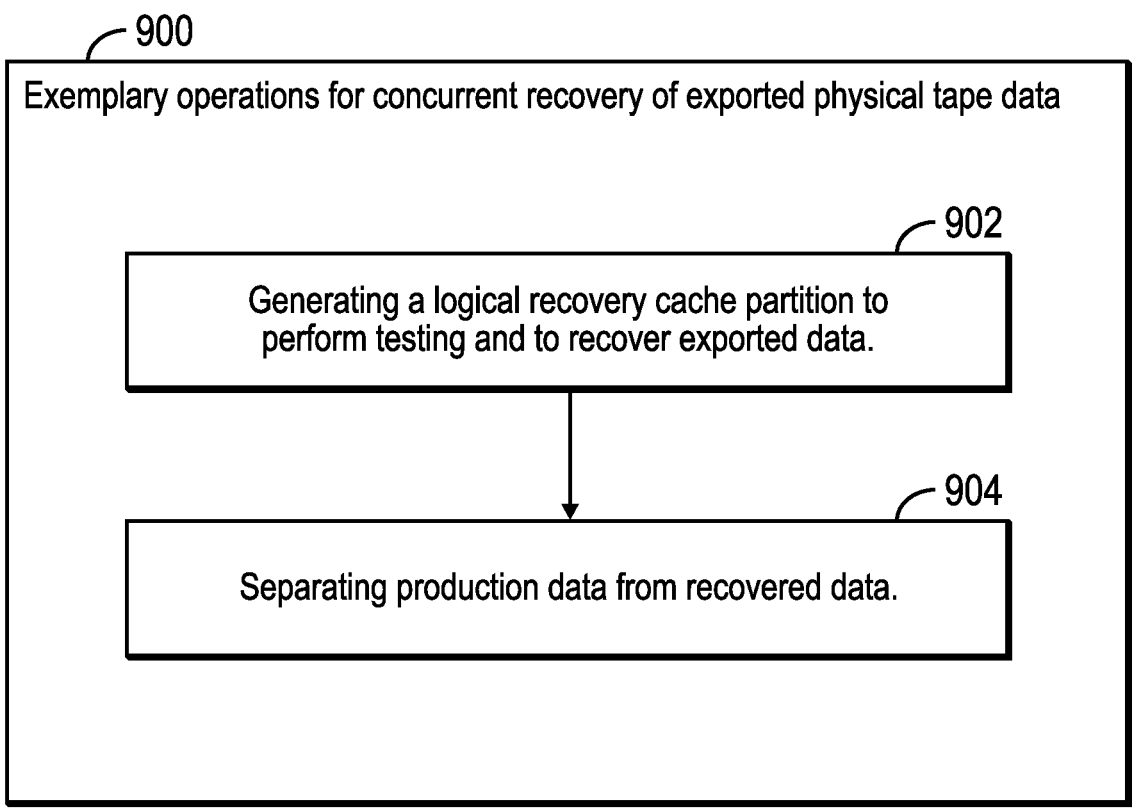
FIG. 9 illustrates a flowchart that shows operations for concurrent recovery of exported physical tape data, in accordance with certain embodiments.

FIG. 9 illustrates a flowchart 900 that shows operations for concurrent recovery of exported physical tape data, in accordance with certain embodiments. Control starts at block 902 in which operations are performed for generating a logical recovery cache partition to perform testing and to recover exported data. From block 902 control proceeds to block 904 in which production data is separated from recovered data Therefore, FIGS. 1-9 illustrate certain embodiments for the concurrent recovery of exported physical tape data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 10:
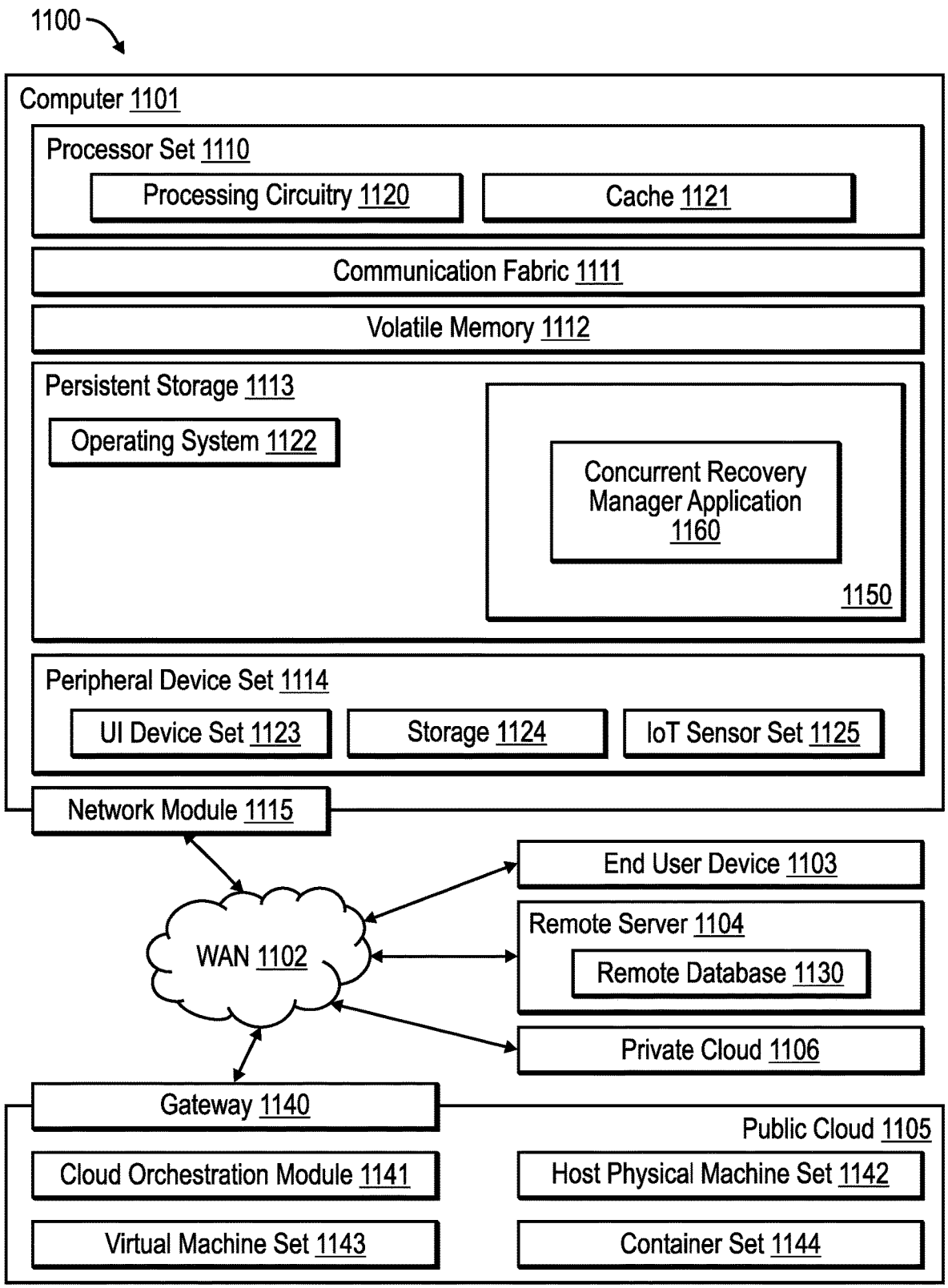
FIG. 10 illustrates a computing environment in which certain components may be implemented, in accordance with certain embodiments.

In FIG. 10. computing environment 1100 contains an example of an environment for the execution of at least some of the computer code (block 1150) involved in performing the operations of a concurrent recovery manager application 1160 that may perform operations shown in FIGS. 1-9.

In addition to block 1150, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1150, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible computer 1101 may be located in a cloud, even though it is not shown in a cloud in FIG. 8. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1150 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid-state storage devices. Operating system 1122 may take several forms, such as various known proprietary operating systems or open-source Portable Operating System Interface-type operating systems that employ a kernel. The code included in block 1150 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. I/O T sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for recovering host data that was copy exported out of a tape library, the method comprising:
    generating, in a production server, a logical recovery cache partition to perform testing and to recover exported data, wherein the exported data comprises physical tape data that comprises the host data that was copy exported out of the tape library; and
    separating production data of the production server from recovered data, wherein concurrent recovery of the physical tape data that was exported is performed in the production server in a production environment, wherein a recovery database instance that is separate from an already existing database instance is generated, wherein the recovery database instance keeps track of recovery data by creating a separation directory in a cache file system to hold the recovered data, and separating the recovered data from the production data, wherein the production server is present with other servers in a grid configuration comprising a plurality of clusters, wherein physical volumes of more than one server in the grid configuration are combined during data recovery, and wherein only one cluster within the grid configuration has the logical recovery cache partition.

2. The method of claim 1, the method further comprising:
    determining, via an error recovery process, whether a logical recovery cache partition already exists on a different cluster within a grid;
    in response to determining that there does not already exist a logical recovery cache partition, determining whether there is an available partition without data of a plurality of possible partitions to use as the logical recovery cache partition; and
    in response to determining that there is an available partition without data, continuing the error recovery process.

3. The method of claim 2, the method further comprising:
    in response to determining that there is no available partition without data, indicating a failure of the error recovery process; and
    in response to determining that there is less than a predetermined amount of available free cache space, indicating a failure of the error recovery process.

4. The method of claim 2, the method further comprising:
    checking to determine if total records being imported exceeds an available space on the logical recovery cache partition, and attempt to increase partition size to accommodate additional space needed for the records being imported; and
    in response to a failure of the attempt to increase the partition size to accommodate the additional space needed, indicating a failure of the error recovery process.

5. The method of claim 2, the method further comprising:
    moving records imported from storage volumes to a recovery database instance; and
    in response to receiving an indication to end an error recovery process, initiating an application to remove error recovery data, an available partition and the recovery database instance.

6. The method of claim 1, wherein a logical volume that resides in the logical recovery cache partition can have a same volser id as a logical volume in a production cache partition.

7. The method of claim 1, wherein a list of production physical tape volume is separated from the list of copy exported tapes used in the recovery, wherein a management interface panel list tapes that will be coming in that will be used by a recovery process to avoid putting production data on the tapes.

8. The method of claim 1, wherein an entity does a logical mount with a special flag indication that a logical volume resides in the logical recovery cache partition, wherein if a request of logical volume is not in the logical recovery cache partition, then a physical tape is looked at, and wherein if a host has verified the host data from the logical recovery cache partition is valid, then the data is transferred to a production volume.

9. The method of claim 1, wherein if an entity has finished testing and recovering the exported data, then the entity is able to issue a host command to purge everything in the logical recovery cache partition, or retain data as is, or to delete the logical recovery cache partition, wherein the logical recovery cache partition can be created on any cluster within a grid, as long as one cluster has physical tape attached.

10. A system for recovering host data that was copy exported out of a tape library, the system comprising:
    a memory; and
    a processor coupled to the memory, wherein the processor performs operations, the operations comprising:
    generating, in a production server, a logical recovery cache partition to perform testing and to recover exported data, wherein the exported data comprises physical tape data that comprises the host data that was copy exported out of the tape library; and
    separating production data of the production server from recovered data, wherein concurrent recovery of the physical tape data that was exported is performed in the production server in a production environment, wherein a recovery database instance that is separate from an already existing database instance is generated, wherein the recovery database instance keeps track of recovery data by creating a separation directory in a cache file system to hold the recovered data, and separating the recovered data from the production data, wherein the production server is present with other servers in a grid configuration comprising a plurality of clusters, wherein physical volumes of more than one server in the grid configuration are combined during data recovery, and wherein only one cluster within the grid configuration has the logical recovery cache partition.

11. The system of claim 10, the operations further comprising:
   determining, via an error recovery process, whether a logical recovery cache partition already exists on a different cluster within a grid;
   in response to determining that there does not already exist a logical recovery cache partition, determining whether there is an available partition without data of a plurality of possible partitions to use as the logical recovery cache partition; and
   in response to determining that there is an available partition without data, continuing the error recovery process.

12. The system of claim 11, the operations further comprising:
   in response to determining that there is no available partition without data, indicating a failure of the error recovery process; and
   in response to determining that there is less than a predetermined amount of available free cache space, indicating a failure of the error recovery process.

13. The system of claim 11, the operations further comprising:
   checking to determine if total records being imported exceeds an available space on the logical recovery cache partition, and attempt to increase partition size to accommodate additional space needed for the records being imported; and
   in response to a failure of the attempt to increase the partition size to accommodate the additional space needed, indicating a failure of the error recovery process.

14. The system of claim 11, the operations further comprising:
   moving records imported from storage volumes to a recovery database instance; and
   in response to receiving an indication to end an error recovery process, initiating an application to remove error recovery data, an available partition and the recovery database instance.

15. A computer program product for recovering host data that was copy exported out of a tape library, the computer program product comprising a computer readable storage medium having computer readable program code embodied therewith, the computer readable program code when executed is configured to perform operations, the operations comprising:
   generating, in a production server, a logical recovery cache partition to perform testing and to recover exported data, wherein the exported data comprises physical tape data that comprises the host data that was copy exported out of the tape library; and
   separating production data of the production server from recovered data, wherein concurrent recovery of the physical tape data that was exported is performed in the production server in a production environment, wherein a recovery database instance that is separate from an already existing database instance is generated, wherein the recovery database instance keeps track of recovery data by creating a separation directory in a cache file system to hold the recovered data, and separating the recovered data from the production data, wherein the production server is present with other servers in a grid configuration comprising a plurality of clusters, wherein physical volumes of more than one server in the grid configuration are combined during data recovery, and wherein only one cluster within the grid configuration has the logical recovery cache partition.

16. The computer program product of claim 15, the operations further comprising:
   determining, via an error recovery process, whether a logical recovery cache partition already exists on a different cluster within a grid;
   in response to determining that there does not already exist a logical recovery cache partition, determining whether there is an available partition without data of a plurality of possible partitions to use as the logical recovery cache partition; and
   in response to determining that there is an available partition without data, continuing the error recovery process.

17. The computer program product of claim 16, the operations further comprising:
   in response to determining that there is no available partition without data, indicating a failure of the error recovery process; and
   in response to determining that there is less than a predetermined amount of available free cache space, indicating a failure of the error recovery process.

18. The computer program product of claim 16, the operations further comprising:
   checking to determine if total records being imported exceeds an available space on the logical recovery cache partition, and attempt to increase partition size to accommodate additional space needed for the records being imported; and
   in response to a failure of the attempt to increase the partition size to accommodate the additional space needed, indicating a failure of the error recovery process.

19. The computer program product of claim 16, the operations further comprising:
   moving records imported from storage volumes to a recovery database instance; and
   in response to receiving an indication to end an error recovery process, initiating an application to remove error recovery data, an available partition and the recovery database instance.

* * * * *